Nov. 9, 1965   W. H. CULVER ETAL   3,216,263
SUPERCONDUCTING GYROSCOPIC APPARATUS
Filed Sept. 29, 1959   3 Sheets-Sheet 3
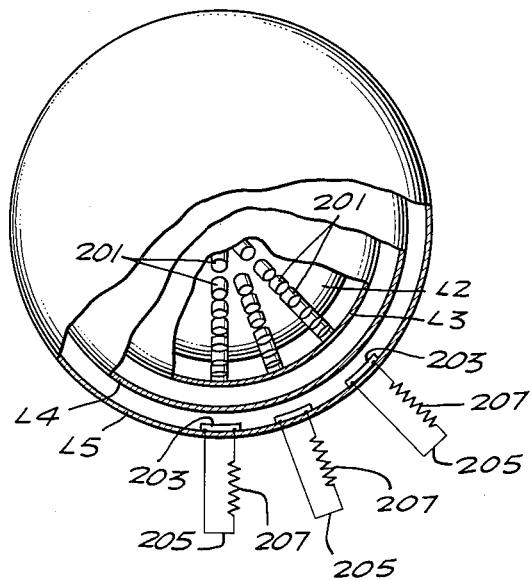
FIG. 3.
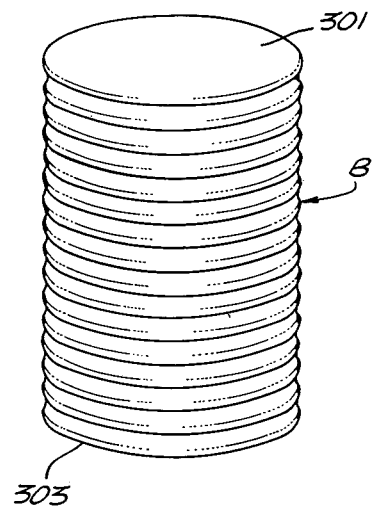
FIG. 4.
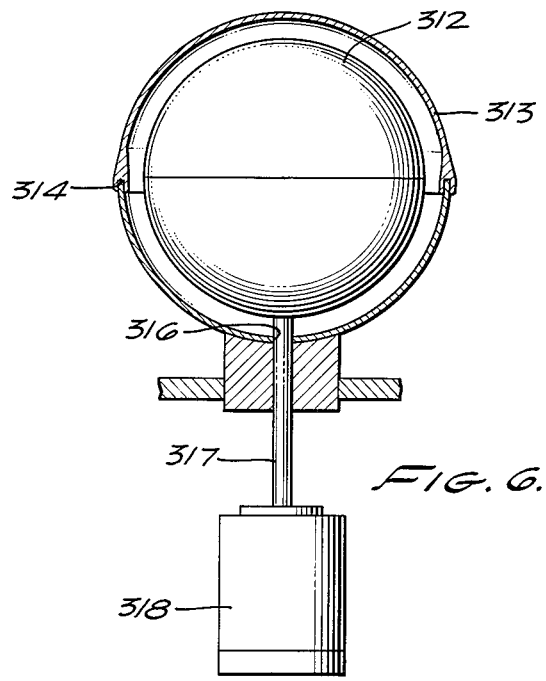
FIG. 6.
FIG. 5.
INVENTORS
WILLIAM H. CULVER
MILFORD H. DAVIS
BY
ATTORNEYS United States Patent Office 3,216,263
Patented Nov. 9, 1965

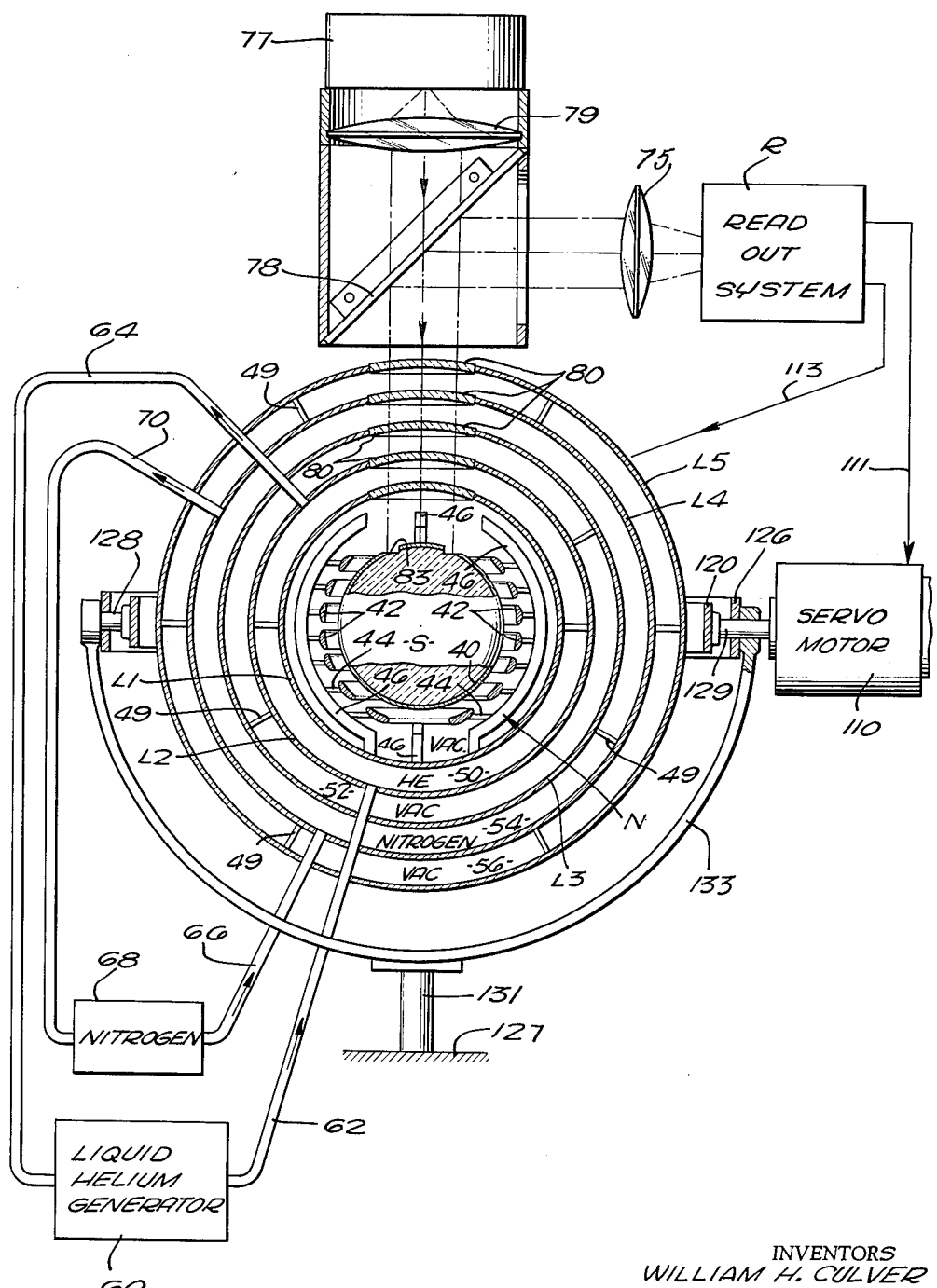

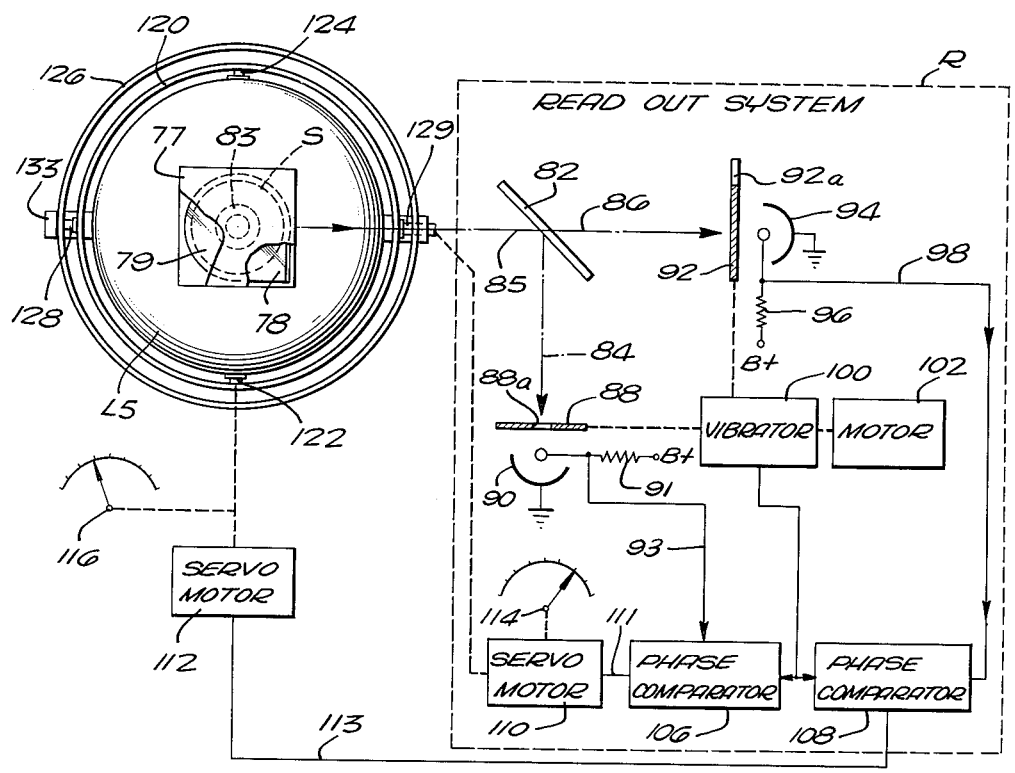
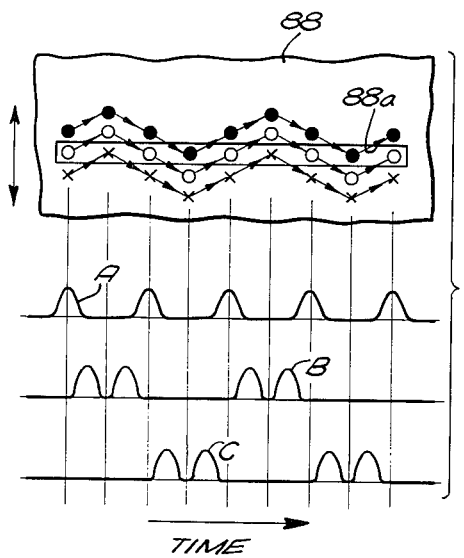
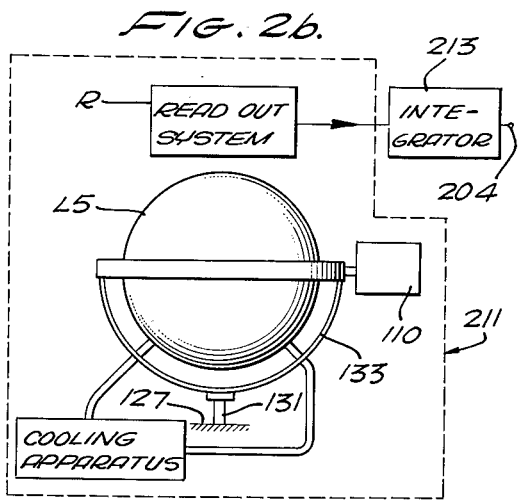

1

3,216,263
SUPERCONDUCTING GYROSCOPIC APPARATUS
William H. Culver and Milford H. Davis, Santa Monica,
Calif., assignors to The Rand Corporation, Santa
Monica, Calif., a California nonprofit corporation
Filed Sept. 29, 1959, Ser. No. 843,906
14 Claims. (Cl. 74—5)

The present invention relates to a gyroscopic apparatus and particularly to an apparatus employing a freely-suspended gyro element, which apparatus is adaptable for use in inertial-guidance systems, and to a method of providing a magnetic flux shield.

The extended projection of vehicles in space and under the sea has resulted in a need for improved guidance and navigation systems. Prior guidance systems have generally employed inertial forces to sense changes or accelerations experienced by a vehicle. One element normally found in inertial-guidance systems is a gyro-stabilized platform which serves to provide a direction reference. In the past such gyros have generally consisted of a motor mounted on low-friction bearings in at least one set of gimbals. However, gyros constructed in this manner generally have several limitations, for example, system friction produces losses, temperature changes result in error-producing mass shifts, and manufacturing tolerances cannot be held sufficiently rigid for desired accuracy.

An accelerometer is another element often present in inertial-guidance systems. In general, prior accelerometers have been subject to certain limitations; for example, they are affected by mechanical vibrations and often have excessively-high drift rates.

As a result of the above considerations, it is apparent that the need exists for a fundamentally-new gyroscopic element which may be employed as an accelerometer or to provide a stabilized direction-reference which would permit greater accuracy in inertial-guidance systems.

In general, the present invention comprises a gyroscopic apparatus including a body having a superconducting surface and supported by a magnetic field. The body is revolved at a relatively-high rate and is enclosed in a vacuum so as to continue to revolve for an extended interval of time. Cooling means may be provided for maintaining the surface of the body below the superconducting transition temperature as well as to maintain superconducting elements which may be used to provide a magnetic field for suspending the body. A sensing system is employed to sense and manifest the rotational axis of the body relative to the environmental apparatus. Depending upon the mass distribution of the body, the system of the present invention may be employed either to provide a stable direction reference or acceleration data.

In the manufacture of the superconducting-surface body, it is important that no magnetic fields be trapped in the body to interact with the magnetic field employed for suspension. If the body is cooled below the superconducting transition temperature without precautions, magnetic flux is trapped therein. As a part of the present invention, a method is provided for forming the superconducting body so that the trapped magnetic flux is minimized.

An object of the present invention is to provide an improved gyroscopic apparatus.

Another object of the present invention is to provide an improved gyroscopic apparatus incorporating superconductivity to enable magnetic suspension of a spinning body.

A further object of the present invention is to provide an improved directional-reference system incorporating a freely-suspended superconducting sphere, and capable of operating accurately over extended intervals of time.

A still further object of the present invention is to provide an improved gyroscopic integrating accelerometer incorporating a superconducting body as a spinning element, and capable of accurately manifesting velocity.

One further object of the present invention is to provide a process for producing a magnetic shield whereby a region substantially free of magnetic fields may be provided.

Still a further object of the present invention is to provide a process wherein superconductive elements are employed to produce a superconducting, magnetic shield.

These and other objects of the present invention will become apparent from the following detailed description when taken in conjunction with the appended drawings, wherein:

FIGURE 1 is a sectionalized side view and diagram of an apparatus constructed in accordance with the principles of the present invention;

FIGURE 2 is a sectionalized top view and diagrammatic representation of the system constructed in accordance with the present invention;

FIGURE 2a is a diagram illustrating the operation of the system of FIGURE 1;

FIGURE 2b is a diagram illustrating another embodiment of the apparatus of FIGURE 2;

FIGURE 3 is a perspective sectionalized view of an alternative form of a portion of the apparatus of FIGURE 1;

FIGURE 4 is a perspective view of an apparatus constructed in accordance with the present invention for providing a magnetic shield;

FIGURE 5 is a perspective view of another apparatus constructed in accordance with the present invention for providing a magnetic shield; and FIGURE 6 is a perspective view of still another alternative apparatus constructed in accordance with the present invention for providing a magnetic shield.

Referring now to FIGURE 1, there is shown a sphere S which is adapted to be supported in a vacuum by magnetic fields. As the sphere S is in a vacuum, only exceedingly-small drag forces resist the continued rotation of the sphere. Therefore, once placed in motion, the sphere S continues to revolve for an extended interval and provides a somewhat idealized gyroscopic element which may be incorporated in navigational or other systems. A sensing system is incorporated with the spinning-sphere apparatus to manifest the axis of rotation of the sphere relative to the vehicle carrying the apparatus. Depending upon the manner in which the mass of the sphere is distributed, the axis of rotation thereof can provide either a reference direction or acceleration data.

The sphere S is magnetically supported by the superconducting surface thereof. Therefore, prior to a description of the apparatus of FIGURE 1, the superconducting phenomena will be briefly considered.

If various metallic elements and compounds are cooled to temperatures of a few degrees Kelvin, their electrical conductivity becomes infinite. Several elements and numerous alloys possess this property which generally occurs at a superconducting transition temperature of around 5° Kelvin. Metals in a superconducting state possess two characteristics significant to the operation of the present invention. Because of the infinite conductivity of a superconductor, electrical currents established therein remain constant. In addition, the superconducting body expels all magnetic fields and has zero magnetic permeability. However, a magnetic field of sufficient intensity will destroy the superconducting properties of the body. That is, superconducting bodies expel all magnetic fields which are below a certain intensity.

It is difficult to cool a body through the superconducting transition temperature so uniformly that all of the material becomes superconducting. A condition may exist where connected regions within the body are superconducting, while the remainder of the material is non-superconducting. In a very thin slab of material such a condition might be described as islands of non-superconducting material surrounded by superconducting regions. Any ambient magnetic field present when the body was still warmer than the superconducting transition temperature will remain in the non-superconducting regions if these exist when the body is cooled through the transition temperature. As a non-superconducting island or area becomes smaller with increased cooling of the body, the magnetic field contained in the island is reduced in cross section and therefore becomes more intense. Finally, this trapped magnetic field or flux is pushed into a small area which cannot be made superconductive because of the resultant intensity of the magnetic field. Therefore, minimizing the trapped magnetic flux in a superconducting body presents a sizeable problem.

The sphere S having a superconducting surface and therefore possessing negative magnetic susceptibility, will have a pressure exerted on it by a magnetic field and may therefore be magnetically supported as a gyro element, for example, see I. Simon, "Forces Acting on Superconductors in Magnetic Fields," Journal of Applied Physics, vol. 24, p. 19, January 1953.

The sphere S in FIGURE 1 is supported upon magnetic fields formed by a network N of superconductors as will be explained hereinafter. The network N is affixed inside a shell L1 which in turn is surrounded by spaced-apart concentric shells L2, L3, L4, and L5, which may be formed of stainless steel.

The chambers formed between the concentric shells L1 through L5 serve to provide insulation and cooling to the sphere S and the network N. As a result, the network is maintained below the superconducting transition temperature and sustains continuous electrical currents which serve to provide a magnetic field that supports the sphere S. Various apparatus, as the read-out system R may be employed to sense and manifest the position of the sphere S.

Reference will now be had to FIGURES 1 and 2 for a detailed consideration of the system constructed in accordance with the present invention. Referring to FIGURE 1, the sphere S in the first embodiment considered, is very accurately formed and has a substantially uniform mass distribution. That is, the center of mass of the body coincides to the geometric center of the body. One exemplary form of the sphere comprises an exactingly-cut single crystal, as quartz, having a superconductive coating 40 (shown in section) uniformly disposed thereon. The coating 40 may be lead or niobium and is formed to contain less than a minimum allowable amount of trapped magnetic flux, as will be described hereinafter.

The sphere S is substantially surrounded by the network N which includes a plurality of circular rings 42 having a generally oval cross section whereby to conform somewhat to the surface of the sphere. The rings 42 are supported by stub rods 44 that are held in vertically-disposed brackets 46. Electrical currents flow whereby to provide magnetic poles between the rings and thereby provide a generally-symmetrical magnetic field to constrain the sphere S, i.e., support the sphere and limit the displacement thereof in any direction. The uniform magnetic field provided to support the sphere S is below the critical intensity which would destroy superconductivity. Other considerations for the magnetic field are set forth in the above-identified article in the Journal of Applied Physics, January 1953.

The brackets 46 not only support the rings 42 but also serve to reduce the displacement of the sphere S from a central position in a manner about to be described. That is, acceleration and deceleration by the vehicle carrying the system of the present invention will tend to physically displace the sphere S from the center of the network N. Normally, the physical displacement may tend to shift flux around the network. However, the vertically extending brackets 46, being superconductive, restrict flux displacement and thereby limit displacement of the sphere S from a central location.

The network N and the sphere S are maintained below the superconducting transition temperature by the structure of shells L1 through L5 maintaining a low temperature inside the shell L1. The shells are held spaced apart by brackets 49 to provide chambers 50, 52, 54, and 56 between the shells L1 through L5 respectively. The chamber 50 contains liquid helium coolant which is introduced through a duct 62 into the chamber 50 from a liquid helium generator 60. Gaseous helium is returned to the generator 60 from the chamber 50 through a duct 64.

The chambers 52 and 56 are evacuated and provide insulation to the interior of the shell L1 from the ambient temperature outside the shell structure. The chamber 54 contains liquid nitrogen which is introduced from a liquid nitrogen generator 68 through a duct 66, the chamber 54, and back to the generator 68 through a duct 70.

As a result of the liquid helium and nitrogen in the chambers 50 and 54 respectively, and the insulation provided by the evacuated chambers 52 and 56, the elements inside the shell L1 are maintained below their superconducting transition temperature and the sphere S is supported spinning for a prolonged interval.

The system to maintain the same relative angular orientation between the sphere S and the structure of shells L1 through L5 will now be considered. A lamp 77 (FIGURE 1) is provided above an angularly disposed partial mirror 78 and a lens 79. The point-source light from the lamp 77 is collimated by the lens 79 and passes through transparent sections 80 of the shells L1 through L5, to illuminate an annular groove 83 in the upper surface of the sphere S. The annular groove 83 which is cut in the sphere S reflects light from the lamp 77 back to the partial mirror 78 to be reflected through a lens 75 to read-out system R. The read-out system is shown in detail in FIGURE 2, and includes a partial mirror 82 which provides two light beams 84 and 86 of substantially the same content as a received light beam 85. The light beam 84 passes through a slit 88a in an opaque mask 88 to impinge upon a photoelectric cell 90. The cathode of the cell 90 is grounded and the plate is connected through a resistor 91 to a source of potential whereby to form an electrical signal that is indicative of the light passing through the slit in the mask 88. In a similar manner, the beam 86 is passed through a slit 92a in a mask 92, which slit is disposed at right angles to the slit 88a. A photoelectric cell 94 is positioned behind the mask 92 to receive light passing through the slit 92a. The cathode of the cell 94 is grounded and the plate is connected through a resistor 96 to a source of potential whereby to form a signal that is indicative of the light passing through the slit 92a. As a result, displacement of the sphere in any direction is manifest by the content of one or both of the light beams 84 and 86.

The masks 88 and 92 are vibrated by a vibrator 100 which is driven by a motor 102. The vibrator 100 is electrically connected to supply a signal of the vibration frequency to phase comparators 106 and 108, which are also connected by conductors 93 and 98 respectively, to the photocells 90 and 94.

In function, the phase comparators 106 and 108 compare the phase of the signals in the conductors 93 and 98 with the signal from the vibrator 100 whereby to derive a continuous signal indicative of the variation in angle between the axis of rotation of the sphere S, and the relative position of the network N and associated structure (as shown in FIGURE 1).

The phase comparator 106 is connected to a servomotor 110 through conductor 111 and the phase comparator 108 is connected through the conductor 113 to a servomotor 112. The servomotors 110 and 112 thus serve to drive dials 114 and 116, respectively to indicate the reference direction in coordinate components. Furthermore, the servomotors control the gimbal arrangement employed to position the network N structure as will now be considered.

The shell L5 (FIGURE 2) is pivotally affixed to a support ring 120 by diametrically-opposed stub shafts 122 and 124. The shaft 122 is connected to the servomotor 112 whereby the shell L5 may be revolved about the axis defined by the shafts 122 and 124. The ring 120 is in turn pivotally connected to a ring 126 by diametrically-opposed stub shafts 128 and 129. The ring 126 is rigidly mounted on the vehicle 127 by means of a shaft 131 which is affixed to a U-shaped mounting bracket 133, the ends of which are affixed to the ring 126. The shaft 129 passes through the ring 126 and is mechanically connected to the servomotor 110; therefore, the ring 120 may be revolved by the servomotor 110 about the axis defined by the shafts 128 and 129.

At a time when the vehicle 127 or apparatus carrying the system of the present invention is positioned in alignment with the directional reference, the sphere may, for example, be positioned as shown in the drawings. That is, the axis of rotation of the sphere S may be perpendicular to the axis of rotation of the shell L5 and the axis of rotation of the ring 120. In general, if the vehicle is displaced from this position with respect to the sphere S, the shell L5 and the ring 120 are similarly displaced. Thereupon, a signal is produced which drives the servomotors 110 and 112 to revolve the shell L1, and the ring 120 and re-establish the desired relationship. The detailed operation of the system to maintain desired relationship will now be considered.

Referring now to FIGURE 2, assume initially that the sphere S is properly orientated with respect to the environmental structure, and that therefore, the light reflected from the groove 83 is imaged at the masks 88 and 92 so that the slits 88a and 92a oscillate to pass light to the photo cells in a somewhat sinusoidal fashion. This condition is illustrated by the white spots (representing the image) and the mask 88 as shown in FIGURE 2a describing a curve of the relative motion between the light beam and the slit with respect to a time base. The movement of the mask relative to the light image is depicted from right to left. As a result of this movement, a signal coinciding to the idealized waveform A is produced by the photocell 90. This signal represents the center frequency of the system and upon application to the phase comparator 106 produces a null signal which causes no action by the servomotor 110.

Assume now that the vehicle 127 carrying the system of the present invention is turned whereby the axis of rotation of the sphere S closes to form an acute angle with the axis of the shaft 129.

Upon this occurrence, the image of the groove 83 (which appears at the mask 88) is displaced with respect to the slit 88a so as to change the period during which the photocell 90 is energized. This situation is depicted by the curve of interconnected spots of FIGURE 2a representing relative motion of the beam to the mask during a sequence of operations. The idealized waveform of the signal developed by the photocell 90 during this sequence is shown by curve B. Of course, the phase waveform of curve B is changed from that of curve A, which change is indicated by the phase comparator 106, which applies a correction signal to the servomotor 110. Upon receiving the correction signal, the servomotor restores the signal to the waveform of curve A by moving the lamp 77 along with the other environmental structure including the network N and the shells L1–L5.

A rotation by the vehicle about the same axis but a different direction results in a relative movement between the image and the mask 88 as indicated by the curve of the interconnected "X" marks in FIGURE 2a. This situation provides a waveform as shown by curve C which is changed oppositely from curve B to command movement by the servomotor 110 in the opposite direction.

Of course, a similar rotation by the vehicle 127 to displace the axis of the sphere S relative to the axis passing through the stub shafts 122 and 124 results in a similar correcting movement by energization of the servomotor 112. In the event that a movement produces an offset in both directions, it is resolved into components and the network N is moved in a similar fashion to that described above to re-establish the desired relationship.

It may therefore be seen that the system operates to provide a stable direction reference by maintaining the environmental structure in the same position relative to the sphere S, while manifesting the movement to accomplish the position on the dials 114 and 116.

In an alternative form of the present invention the magnetic field for supporting the sphere S may be provided by permanent magnets. Referring to FIGURE 3, a plurality of small permanent magnets 201 are shown positioned between shells L2 and L3 of the apparatus of FIGURE 1. Of course, if the magnets 201 are employed, the network N is removed. The magnets 201 may be placed in various arrangements to provide the desired supporting magnetic field.

Another form of apparatus for damping non-rotational movement of the sphere S (which may be applied to the apparatus of FIGURE 1) is also illustrated in FIGURE 3. Electrical coils 203 are mounted on the inner surface of the shell L5, and are individually connected in series-loop circuits 205 with resistors 207 located outside the thermal shields.

In the event of non-rotational movement, as oscillation of the sphere S, a variation in position changes the supporting magnetic field. This change induces voltages in the coils 203 which produce electrical currents in the loop circuits 205. The energy is thus dissipated in resistances 207 which dissipation results in damping the non-rotational movement of the sphere.

The above description assumes that the center of mass of the sphere S coincides substantially to the geometrical center of the sphere, and a stable direction reference is provided. To provide an accelerometer in accordance with the present invention, the center of mass is simply offset along the axis of rotation. If the center of mass of the sphere is thus displaced from the center of the sphere, acceleration produces a torque on the sphere proportional to the acceleration. That is, the torque exerted upon the sphere is proportional to: the acceleration, the mass of the sphere, and the distance from the center of mass to the center of the sphere. This torque causes the sphere to precess at an angular velocity which is proportional to the torque and inversely proportional to the angular momentum of the sphere. The angular rate of precession is proportional to the acceleration, therefore, the total angle of precession is proportional to velocity.

The velocity can be integrated, in a single integration, to indicate the distance travelled. Therefore, normally the desired information, i.e., distance, is accurately provided after a single integration. That is, vibration, friction, and other random effects do not affect the first integration which is inherently performed within the apparatus, and as a result, greater accuracy is achieved.

Referring to FIGURE 2b, there is shown a system of the present invention adapted for use as an accelerometer to indicate distance. The apparatus incorporates the previously disclosed system 211 in which the sphere S has a center of mass which is displaced from the center of the sphere. The angular offset of the sphere S is sensed by a read-out system R (previously described) and applied to an integrator 213. The integrator 213 may comprise various analog integrator circuits or alternatively, various mechanical or other integrating apparatus to provide an electrical signal at a terminal 204 which is indicative of the distance travelled in accordance with the above considerations. The accelerometer will conventionally be mounted on a stable platform.

A further application of the apparatus wherein the center of mass of the sphere is displaced from the center of the sphere, is to employ the apparatus as a tuned pendulum. An apparatus of this type, set in motion with the angular momentum directed vertically, when it is at rest will continue to point to the local vertical regardless of the location to which the instrument is transported. Of coure, this consideration is subject to variation with changes in local gravity. The use and function of devices of this type are considered to some extent in a Report 6398–S–14 of the Instrumentation Laboratory M.I.T.

With regard to the manner in which the disclosed embodiment of the present invention may be manufactured, consider first the formation of the sphere S. As previously indicated, the sphere S includes superconducting coating 40 which contains a minimal amount of trapped magnetic flux. In order to reduce the trapped magnetix flux, various techniques may be employed. It is important to cool the sphere S below the superconducting transition temperature in a region which is as free of magnetic field as possible.

In providing a magnetic field-free region, i.e., a region with a minimal amount of magnetic flux, a superconducting shield may be employed. Of course, the superconducting shield must contain very little trapped flux, or such flux will pass through the sphere S and possibly be trapped therein. The formation of a superconducting shield containing very little trapped magnetic flux in which the sphere S can be cooled to superconductivity comprises a portion of the present invention and will now be considered in detail. First, the amount of magnetic flux trapped in the shield may also be reduced by zone cooling in which the shield is first cooled to superconductivity at one point, and this cooling, and superconductivity, spreads from that point, thus preventing the formation of warmer areas, not superconducting and containing magnetic flux, surrounded by superconducting areas. This zone cooling may be effected either by careful temperature control or alternatively by forming the shield of material which possesses a gradient in its property of superconducting transition temperature.

Considering shield structure, one form of magnetic shield is illustrated in FIGURE 4 and comprises a closed cylindrical bellows B which may be compressed by exerting forces on opposing walls 301 and 303. The use of a collapsible or compressible shield has certain advantages in that it can be cooled below the superconducting transition temperature while occupying a small space and thereafter expanded to provide a sizable shielded volume.

The bellows B is, of course, formed of or clad with superconductive material, e.g., lead or niobium, and is cooled below the superconducting transition temperature in a magnetically shielded space, which may comprise a superconducting magnetic shield. For example, the magnetic shield of FIGURE 4 may be cooled to a superconducting state while being shielded by the shield structure of FIGURE 5, or vice versa. The shield of FIGURE 5 comprises a stack 305 of discs 306. The center discs contain an aperture while the end discs are solid. As a result, a cylindrical cavity 307 exists in the stack 305. Cooling the stack 305 below the superconducting transition temperature in a space somewhat free of magnetic flux still may allow some fields to be trapped. However, thereafter the discs 306 are randomly re-arranged with the result that the trapped flux is reduced and distributed. Therefore, the shield of FIGURE 5 may now receive the shield of FIGURE 4 so that the latter may be cooled in a relatively flux-free space and thus contain less trapped flux.

This process of magnetically shielding a shield structure during cooling by employing a superconducting shield may be repeatedly performed to obtain a body containing very little trapped flux. A structure which is useful in the repeating process is shown in FIGURE 6. This apparatus also incorporates means for moving the inner body relative to the shield during cooling whereby to further reduce trapped flux in the inner body.

A plurality of concentric shells, capable of fitting in one another are provided; two shells 312 and 313 are illustrated. The shells comprise two hemispheres which are joined at a groove joint 314. The lower hemispheres of the shells contain a bore, as the bore 316, through which a shaft 317 may be passed or connected to the shell. The shaft 317 is connected to a motor 318 for revolving the internal shell 312 with respect to the external shell.

According to the process, the external shell 313 is first cooled below the superconducting transition temperature. This shell is then opened by separating the hemispheres thereof and a shell 312 is placed therein, the shell 312 being cooled to a temperature only slightly above the transition temperature and the shell 313 being maintained below the transition temperature. The shell 312 is then revolved with respect to the shell 313 and cooled as by circulating liquid helium in the shell 313 to below the superconducting transition temperature. The relative movement between the shell 312 and the shell 313 serves to expel some of the trapped flux from the shell 312.

After the shell 312 is cooled below the superconducting transition temperature, the amount of flux trapped therein is less than the amount of flux trapped in the external shell 313. Therefore, the shell 312 is employed as an external shell and another shell is placed inside whereby the operation described above is repeated to produce a shell with a lesser amount of trapped flux. This operation may be repeated many times to eventnually produce a shell which contains exceedingly small amounts of trapped flux. The ultimate shell produced in this manner may then be employed to shield the sphere S or another shield during the cooling thereof whereby to produce a superconducting sphere with a minimal amount of trapped magnetic flux.

After the sphere S has been formed and rendered superconducting in a field-free region, it is placed in the network N. This may be accomplished by positioning the rings 42 around the sphere under liquid helium and affixing the rings to the brackets by means of the shafts 44. Normally, the currents in the rings are established prior to assembly by cooling to superconduction with a magnet through the rings. Withdrawal of the magnet then establishes the desired currents.

After the network N is formed about the sphere and energized as above described, the sphere is placed in motion by directing a jet of helium against the equatorial surface thereof in the desired direction of rotation. The shells L1–L5 may then be closed to complete the assembly operation. The space within the shell L1 and the chambers 52 and 56 are then evacuated and the chambers 50 and 54 are connected to sources of liquid helium and nitrogen, respectively.

While the forms of the invention shown and described herein are fully capable of achieving the objects and providing the advantages hereinbefore stated, it will be realized that they are capable of some modification without departure from the spirit of the invention. For this reason, we do not mean to be limited to the forms shown and described but rather to the scope of the appended claims.

We claim:
1. A gyro apparatus comprising: a body having a superconducting surface and adapted to be spun to establish a spin axis therefor, said body acting as the inertial element of the apparatus; magnetic means for suspending said body by the pressure exerted thereon by a magnetic field cooperating with diamagnetic properties of the superconducting surface; means for sustaining a partial vacuum about said body to allow low friction spin of said body; and means for manifesting the orientation of said body.

2. An apparatus according to claim 1, wherein the mass of said body is symmetrically disposed whereby said body remains stable to provide an inertial reference with movement of said magnetic means.

3. An apparatus according to claim 1 wherein the center of mass of said body coincides substantially to the center of the body whereby to provide an inertial reference regardless of movement of said magnetic means.

4. An apparatus according to claim 1 wherein the center of mass of said body is displaced from the center of the body, whereby the spin axis of said body precesses relative to said magnetic means by acceleration of said apparatus.

5. Apparatus according to claim 1 wherein said magnetic means comprises superconductive members providing magnetic fields to support said body.

6. A gyroscopic instrument comprising: a sphere having a superconducting surface and adapted to be spun to form the inertial element of the instrument; magnetic means for forming a somewhat symmetric three dimensional magnetic field for suspending said sphere by virtue of the coaction of said field with the diamagnetism of said superconducting surface; means for sustaining a partial vacuum about said sphere; means for maintaining the surface of said sphere below the superconductive transistion temperature thereof; and means for manifesting the orientation of said sphere.

7. Apparatus according to claim 6 wherein said sphere comprises a sphere of crystalline material having a coating of superconductive material.

8. Apparatus according to claim 6 wherein said means for maintaining the surface of said sphere below the superconductive transition temperature comprises a plurality of concentric shells having spaces therebetween, at least one first of said spaces being evacuated, and at least one second of said spaces containing liquid helium.

9. Apparatus according to claim 6, wherein said magnetic means includes at least one induction coil linked to said magnetic field and connected to a load means whereby movement of said sphere to alter said magnetic field is damped.

10. Apparatus according to claim 6 wherein said magnetic means comprises a web of superconductive conductors encasing said sphere.

11. A gyroscopic instrument comprising: a sphere having a superconductive surface and adapted to be spun to form the inertial element of the instrument, the center of mass of said sphere substantially coinciding with the geometrical center of the sphere; means for forming a somewhat symmetric three dimensional magnetic field for suspending said sphere by virtue of the coaction of said field with the diamagnetism of said superconductive surface; means for maintaining a partial vacuum about said sphere; means for maintaining the surface of said sphere below the superconductive transition temperature thereof; and means for manifesting the position of said sphere to indicate a stable reference direction.

12. A gyroscopic instrument comprising: a sphere having a superconducting surface and adapted to be spun to form the inertial element of the instrument, the center of mass of said sphere being offset from the geometrical center of the sphere; magnetic means for forming a somewhat symmetric three dimensional magnetic field for suspending said sphere by virtue of the coaction of said field with the diamagnetism of said superconducting surface; means for maintaining a partial vacuum about said sphere; means for maintaining the surface of said sphere below the superconductive transition temperature thereof; and means for manifesting the position of said sphere relative to said magnetic means to indicate the velocity of said instrument.

13. An apparatus according to claim 1 wherein said superconducting surface is substantially free of trapped magnetic flux.

14. An instrument according to claim 6 wherein said superconducting surface is substantially free of trapped magnetic flux.

References Cited by the Examiner

UNITED STATES PATENTS

| | | | |
|---|---|---|---|
| 705,702 | 7/02 | Ponthus et al. | 74—5.7 X |
| 2,691,306 | 10/54 | Beams et al. | 74—5.6 |
| 2,749,715 | 6/56 | Tice | 62—62 |
| 2,785,573 | 3/57 | Bentley | 74—5 |
| 2,831,329 | 4/58 | Morrison | 62—62 |
| 2,855,781 | 10/58 | Alburger | 74—5 |
| 2,857,767 | 10/58 | Werndl | 74—5.37 |
| 2,871,703 | 2/59 | Walker | 74—5.6 |

MILTON KAUFMAN, *Primary Examiner.*

BROUGHTON G. DURHAM, SAMUEL BOYD, ARTHUR M. HORTON, *Examiners.*